United States Patent [19]

Joyce et al.

[11] Patent Number: 4,785,398
[45] Date of Patent: Nov. 15, 1988

[54] VIRTUAL CACHE SYSTEM USING PAGE LEVEL NUMBER GENERATING CAM TO ACCESS OTHER MEMORIES FOR PROCESSING REQUESTS RELATING TO A PAGE

[75] Inventors: Thomas F. Joyce, Westford; Ming T. Miu, Chelmsford; Jian-Kuo Shen, Belmont; Forrest M. Phillips, North Chelmsford, all of Mass.

[73] Assignee: Honeywell Bull Inc., Waltham, Mass.

[21] Appl. No.: 811,044

[22] Filed: Dec. 19, 1985

[51] Int. Cl.<sup>4</sup> ............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,601,812 | 8/1971 | Weisbecker | 340/172.5 |
| 3,618,040 | 11/1971 | Iwamote et al. | 340/172.5 |
| 4,264,953 | 4/1981 | Douglas et al. | 364/200 |
| 4,453,230 | 6/1984 | Mizoguchi et al. | 364/900 |
| 4,467,414 | 8/1984 | Akagi et al. | 364/200 |
| 4,481,573 | 11/1984 | Fukunaga et al. | 364/200 |
| 4,493,026 | 1/1985 | Olnowich | 364/200 |
| 4,495,575 | 1/1985 | Eguchi | 364/200 |
| 4,669,043 | 5/1987 | Kaplinsky | 364/200 |

OTHER PUBLICATIONS

"CPU Cache Memories", by Alan Jay Smith, Univ. of California, Berkeley, Draft, Apr. 24, 1984, pp. 1–46.
"Cache-Based Computer Systems", by K. R. Kaplan & R. O. Winder, Mar. 1973, Computer, published by IEEE Computer Society, pp. 30–36.
"Structural Aspects of the System/360 Model 85", I General Organization, by C. J. Conti, D. H. Gibson, & S. H. Pitkowsky, IBM Systems Journal, vol. 7, No. 1, 1968, pp. 2–14.
"Structural Aspects of the System/360 Model 85", II The Cache, by J. S. Liptay, IBM Systems Journal, vol. 7, No. 1, 1968, pp. 15–21.

*Primary Examiner*—Raulfe B. Zache
*Assistant Examiner*—Michael J. Ure
*Attorney, Agent, or Firm*—Faith F. Driscoll; John S. Solakian

[57] ABSTRACT

A multiprocessor computer system includes a main memory and a plurality of central processing units (CPU's) which are connected to share main memory via a common bus network. Each CPU has instruction and data cache units, each organized on a page basis for complete operating compatibility with user processes. Each cache unit includes a number of content addressable memories (CAM's) and directly addressable memories (RAM's) organized to combine associative and direct mapping of data or instructions on a page basis. An input CAM in response to a CPU address provides a cache address which includes a page level number for identifying where all of the required information resides in the other memories for processing requests relating to the page. This organization permits the processing of either virtual or physical addresses with improved speed and reduced complexity and the ability to detect and eliminate both consistency and synonym problems.

22 Claims, 14 Drawing Sheets

|  | CAC | | |
|---|---|---|---|
| LEVEL 0 | SEG NO. | PAGE NO. | VB |
| | ⋮ | | |
| LEVEL 31 | SEG NO. | PAGE NO. | VB |

*Fig. 4a.*

|  | PAC/PFC PAR/PFR | |
|---|---|---|
| LEVEL 0 | PAGE FRAME NO. | VB |
| | ⋮ | |
| LEVEL 31 | PAGE FRAME NO. | VB |

*Fig. 4b.*

|  | BTA/BVA | |
|---|---|---|
| | BLOCK 0 VB | BLOCK 0 WB |
| | BLOCK 1 VB | BLOCK 1 WB |
| LEVEL 0 | ⋮ | |
| | BLOCK 63 VB | BLOCK 63 WB |
| LEVEL 1 | | |
| | BLOCK 0 VB | BLOCK 0 WB |
| | BLOCK 1 VB | BLOCK 1 WB |
| LEVEL 31 | ⋮ | |
| | BLOCK 63 VB | BLOCK 63 WB |

*Fig. 4c.*

| | 0    PGR/ICR    35 |
|---|---|
| | BLOCK 0 DOUBLE WORD 0 |
| | BLOCK 0 DOUBLE WORD 7 |
| | BLOCK 1 DOUBLE WORD 0 |
| | BLOCK 1 DOUBLE WORD 7 |
| LEVEL 0 | ⋮ |
| | BLOCK 63 DOUBLE WORD 0 |
| | BLOCK 63 DOUBLE WORD 7 |
| LEVEL 1 | |
| | BLOCK 0 DOUBLE WORD 0 |
| | BLOCK 0 DOUBLE WORD 7 |
| | BLOCK 1 DOUBLE WORD 0 |
| | BLOCK 1 DOUBLE WORD 7 |
| LEVEL 31 | ⋮ |
| | BLOCK 63 DOUBLE WORD 0 |
| | BLOCK 63 DOUBLE WORD 7 |

*Fig. 4d.*

| | PTA | |
|---|---|---|
| LEVEL 0 | PRIVATE BIT | MODIFIED BIT |
| | ⋮ | |
| LEVEL 31 | PRIVATE BIT | MODIFIED BIT |

*Fig. 4e.*

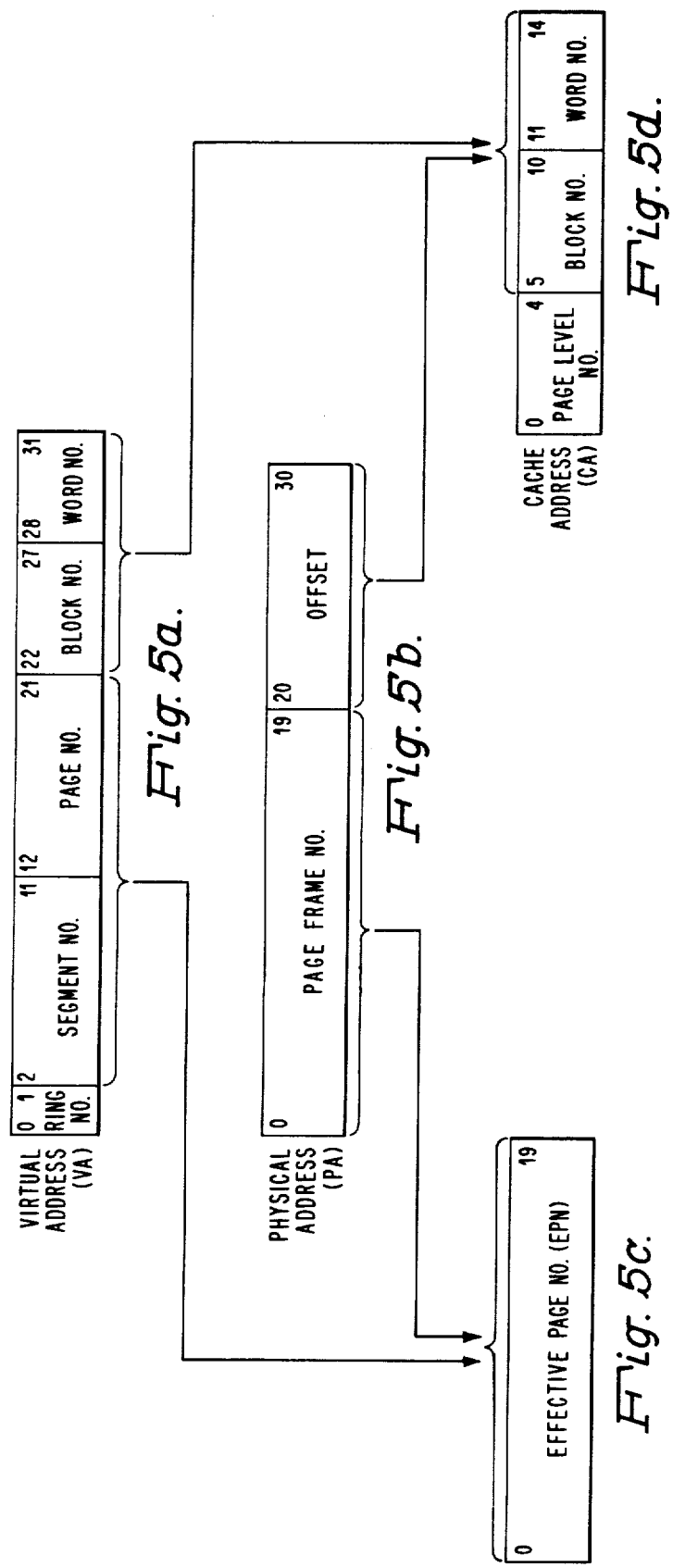

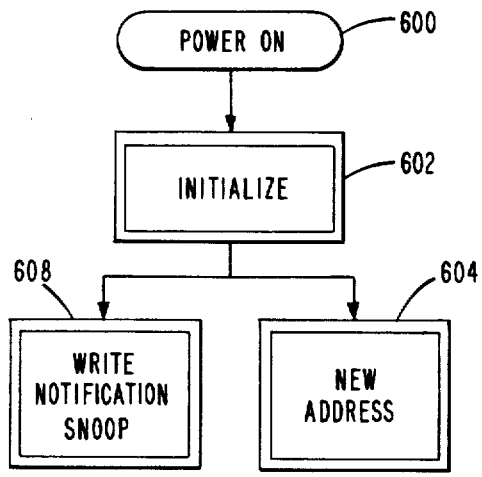
Fig. 6a.
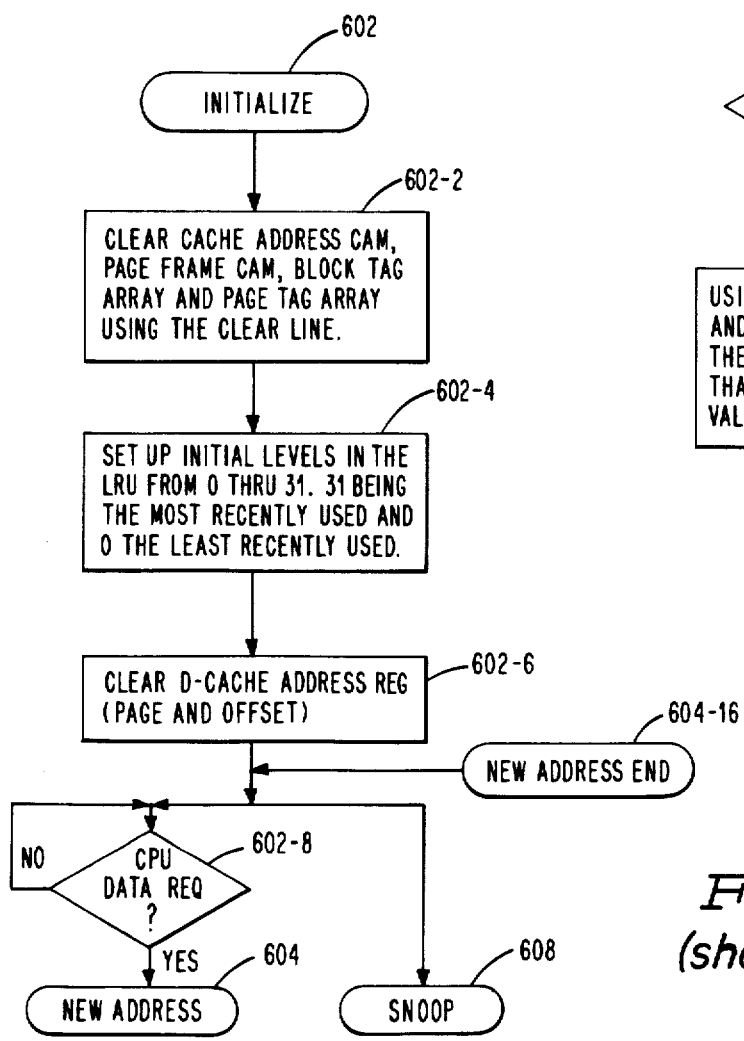
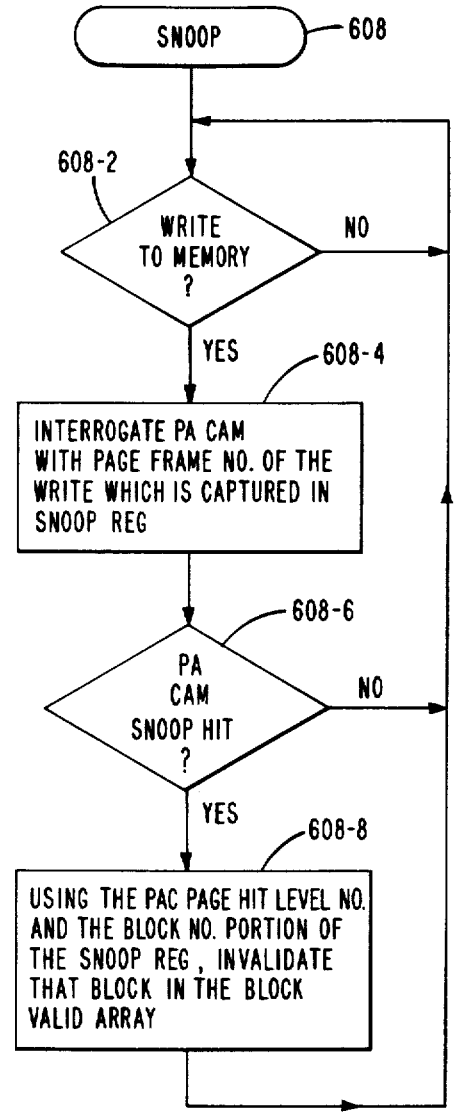
Fig. 6b.
(sheet 1 of 5)

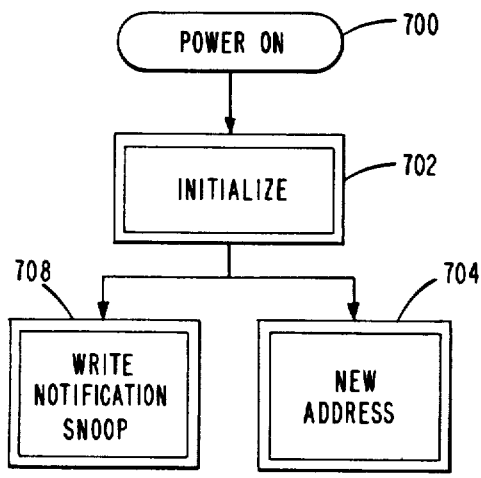
Fig. 7a.
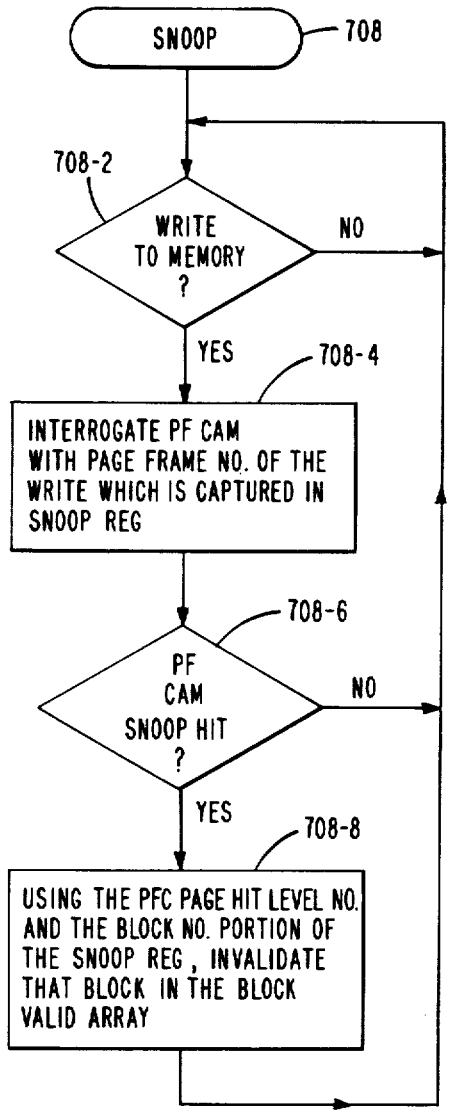
Fig. 7b.
(sheet 1 of 3)
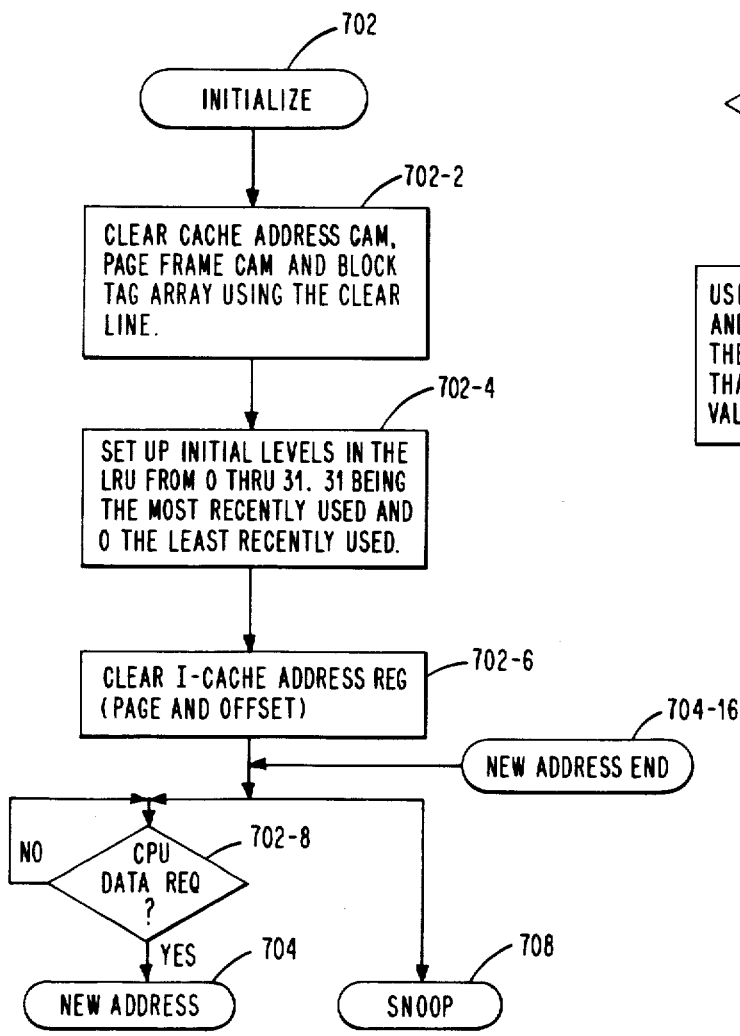

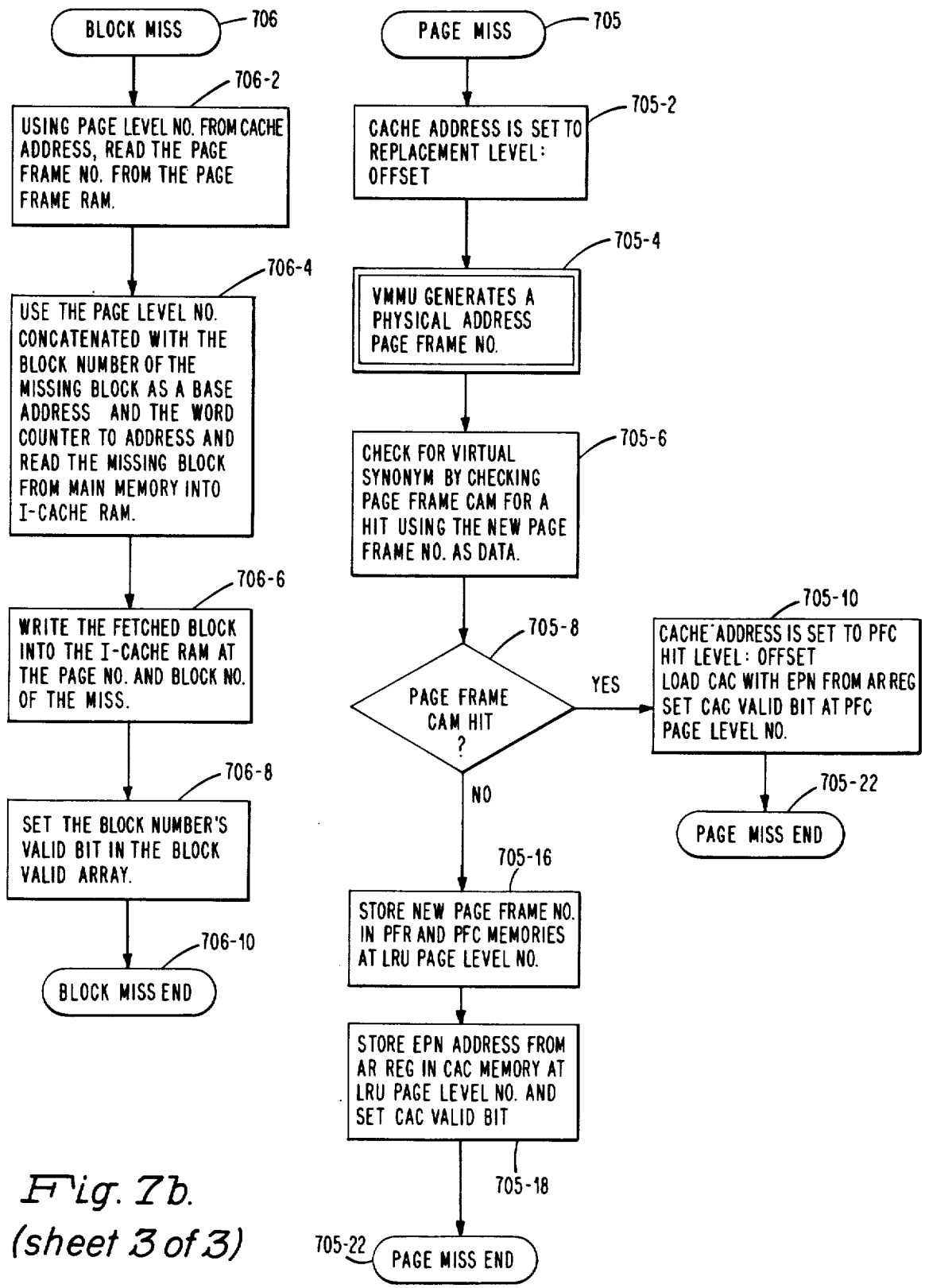
Fig. 7b. (sheet 3 of 3)

VIRTUAL CACHE SYSTEM USING PAGE LEVEL NUMBER GENERATING CAM TO ACCESS OTHER MEMORIES FOR PROCESSING REQUESTS RELATING TO A PAGE

BACKGROUND OF THE INVENTION

1. Field of Use

The present invention relates to computer systems and more particularly to a cache system for use in such systems.

2. Prior Art

More and more computer systems include processors which are capable of executing instructions at a higher and higher rates as compared with the speed of high capacity main memory systems. To improve instruction execution speed, these systems utilize low capacity, high speed cache memories. The cache memories are used to store a limited number of instructions and/or data blocks. For each memory read operation, the processor checks the cache memory to determine if the information is stored there (a hit occurred). When there is a hit condition, the information will be read out from cache memory; otherwise (a miss condition), it will be fetched from main memory.

With such higher and higher processor instruction execution rates, the cache hit rate becomes extremely important in terms of both processor and system performance. That is, a hit rate less than 95 percent can result in a substantial decrease in overall system performance. This is particularly true in the case of multiprocessing systems.

Normally, the processor addresses the main and cache memories using a virtual address defining a relative memory location. The real or physical address defining an actual memory location is obtained by translating the virtual address. The virtual address normally includes segment, page and word address bits. The word address bits are not translated but the segment and page address bits are translated by an address translation buffer (ATB) or a memory management unit (MMU).

Since main memory is much larger than the cache memory, there are several common mapping techniques used for efficiently mapping information from main memory into the cache memory. A number of these techniques are described in an article by C. J. Conti entitled, "Concepts for Buffer Storage," published in the March 1969 issue of IEEE Computer Group News. One technique is the sector technique in which the cache and main memories are divided into a number of sections or pages, each of which consists of a large number of blocks. A main memory sector or page is mapped into any one of the sectors or the cache memory a block at a time. Each block resident in the cache memory has a tag associated with it for determining when the block is in cache memory. The cache memory is capable of holding only a small number of sectors, and each cache sector, at any given time, can contain only blocks from the same main memory sector. The search in the sector organized cache is fully associative in that any block potentially can be found in any one of the cache sectors.

While the system requires only one tag per sector and one validity bit per block, all of the tags of all of the blocks stored in the cache memory must be searched which is time-consuming or requires additional hardware.

In another technique, that of set associative, the cache and main memories are divided into a plurality of sets of blocks. A main memory block may be mapped into any one of the cache blocks in one set. While this technique reduces the amount of hardware required by the fully associative technique, it still requires a tag for each stored block. Therefore, the number of entries within a set is increased. This is accompanied by a factorial increase in comparison hardware.

In another technique, that of direct mapping, any main memory block can be placed in only one cache block. That is, each main memory block is preassigned a certain cache memory location. Therefore, searching is faster and requires a small amount of hardware. While the arrangement has these advantages, it is said to lack flexibility. Therefore, the set associative technique has been employed using a limited number of entries per set.

In order to provide a balance between the extremes in cache organizations in transferring too much data or requiring a large number of tags, one system employs a set associative sector cache. This system is disclosed in U.S. Pat. No. 4,493,026. While effeciency is achieved over the fully associative technique, the system still limits the number of entries per set and limits the amount of blocks of data which can be stored.

It is accordingly a primary object of this invention to provide an improved page or sector cache unit.

It is a further object of this invention to provide a cache unit for a processing unit which requires a small number of tags thus minimizing the amount of hardware circuits and cost.

It is another further object of the present invention to provide a cache unit which can be used for storing instructions or data and is usable in a multiprocessing system.

It is still a further object of the present invention to provide a fast access cache unit capable of storing data for a number of pages with great flexibility.

SUMMARY OF THE INVENTION

The foregoing objects are achieved according to the present invention by a cache memory having a number of content addressable memories (CAM's) and directly addressable memories (RAM's) organized to combine associative and direct mapping of data or instructions on a page basis. More particularly, an input CAM in response to an address generated by an associated processing unit (CPU), provides a cache address including a page level number which identifies where all of the required information resides in the other memories for processing the request relating to the specified page. This organization permits the efficient processing of either virtual or physical addresses with improved speed and reduced complexity and the ability to detect and eliminate both consistency and synonym problems.

A consistency or coherence problem can occur via multicache memory system when data inconsistency exists in the private cahce memories and main memory. That is, potentially, the contents of the same main memory block can appear in several cache memories at the same time. When sufficient steps are not taken, the multiple copies of that block stored in the cache memories can differ with one another and with main memory.

The cache memory of the present invention utilizes a physical address CAM which is coupled to respond to the addresses of data being written into main memory by any other processing unit. The CAM operates to generate a page level number which can be utilized by one of the remaining memories storing block address information to invalidate the affected block if stored in the cache memory.

Because of the random relationship existing between a virtual (logical) and its translated physical (absolute) address, two virtual addresses may be mapped into the same physical address. This results in a synonym problem The same physical address CAM is also used to detect potential synonym problems. That is, the physical address CAM operates to detect any comparison between the VMMU new physical address and a previously stored valid physical address. Upon such detection, the page level number provided by the physical address CAM is used to store the new virtual address in the input CAM at the specific level. This eliminates the need to reload the same page as well as eliminating the synonym problem.

The use of a common cache address (page level number) for accessing all of the required information pertaining to a page reduces the complexity and enhances the overall performance of the cache memory. The cache organization also permits address translation to be overlapped with the interrogation of the input CAM. As illustrated in the different embodiments of the present invention, this same organization can be utilized for both instruction and data cache memories.

Additionally, the cache memory of the present invention can be used to process either virtual or physical addresses. That is, the common cache address will be generated in the same manner in response to either a virtual or physical address.

The organization of the cache memory permits the use of like VLSI memory elements, further reducing costs and enhancing speed of operation.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4a through 4e are diagrams illustrating the logical organizations of the different memories which are included in the cache memories of FIGS. 2 and 3.

FIGS. 5a through 5d are diagrams illustrating the types of addresses utilized in the cache memories of FIGS. 2 and 3.

FIG. 6a is a flow diagram used to show the overall operation of the data cache memory of FIG. 2.

FIG. 6b is a flow diagram which shows in greater detail, the operations of FIG. 6a.

FIG. 7a is a flow diagram used to show the overall operation of the instruction cache memory of FIG. 3.

FIG. 7b is a flow diagram which shows in greater detail, the operations of FIG. 7a.

DESCRIPTION OF THE SYSTEM OF FIG. 1

Figure 1:
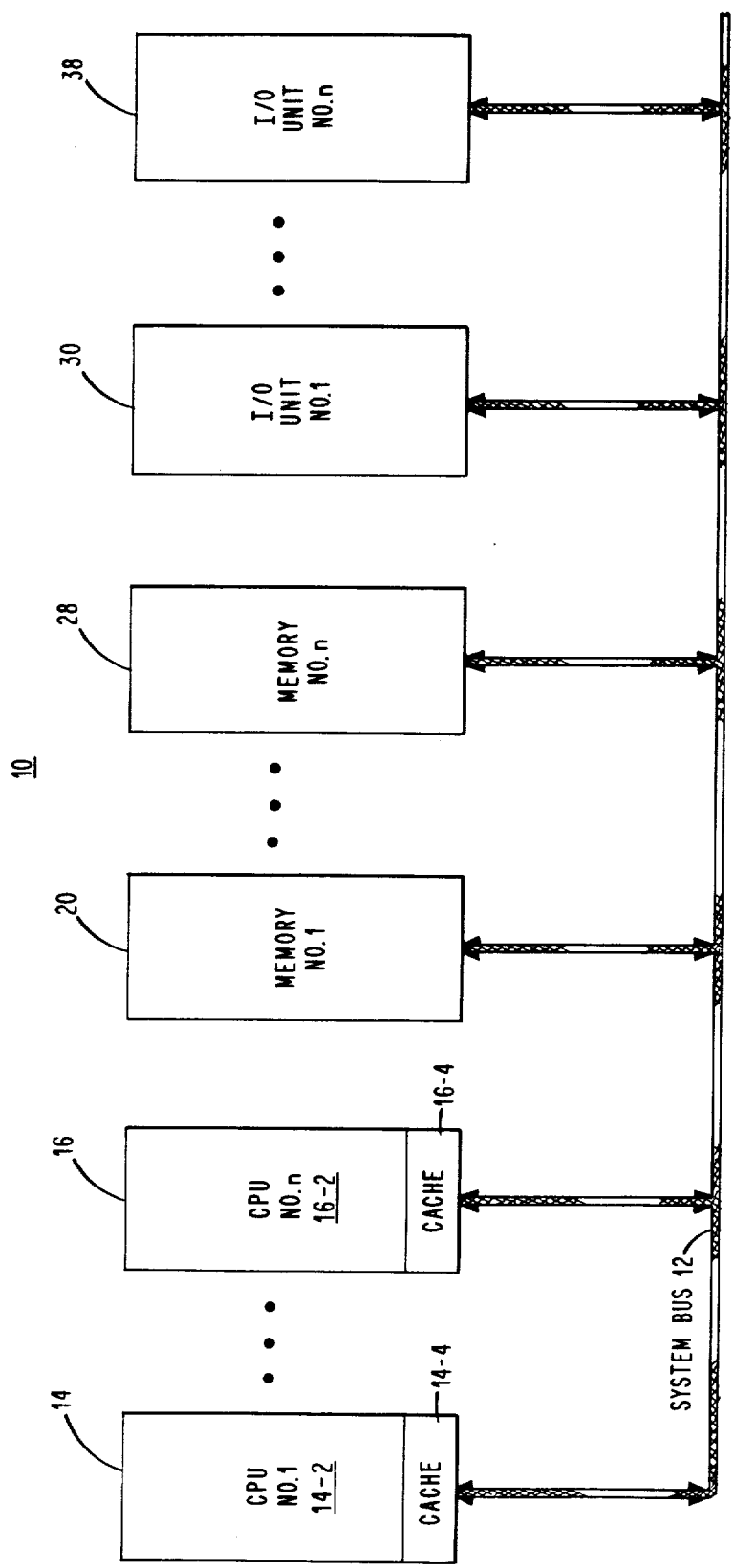
FIG. 1 is a block diagram of a multiprocessing system which includes the apparatus of the present invention.

FIG. 1 shows a multiprocessing system 10 which includes a plurality of subsystems 14 through 32 coupled in common to a system bus 12. The subsystems include a plurality of central subsystems 14 through 16, a plurality of memory subsystems 20 through 28 and a number of input/output peripheral subsystems 30 through 38. Each subsystem includes an interface area (not shown) which enables the associated unit or units to transmit or receive requests in the form of data, addresses and commands to or from system bus 12.

The organization of each central subsystem is the same. Each central subsystem includes a pipelined central processing unit (CPU) such as 14-2 which couples to a cache unit such as 14-4. For the purpose of the present invention, each CPU can be considered conventional in design and may be implemented using 32-bit microprocessor chips capable of processing virtual and physical addresses.

Figure 2:
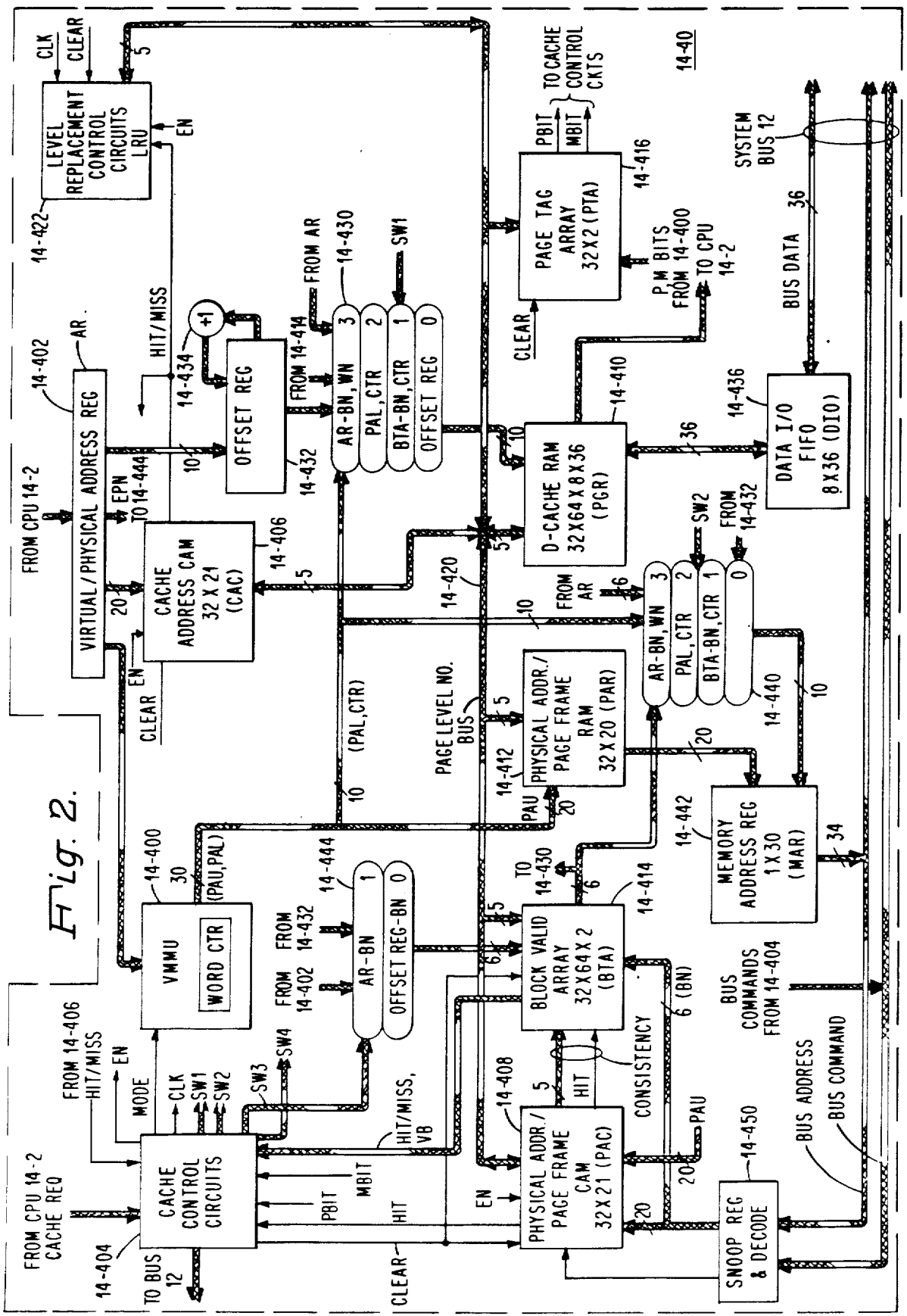
FIGS. 2 and 3 respectively are block diagrams of data and instruction cache memories which are constructed according to the present invention.
Figure 3:
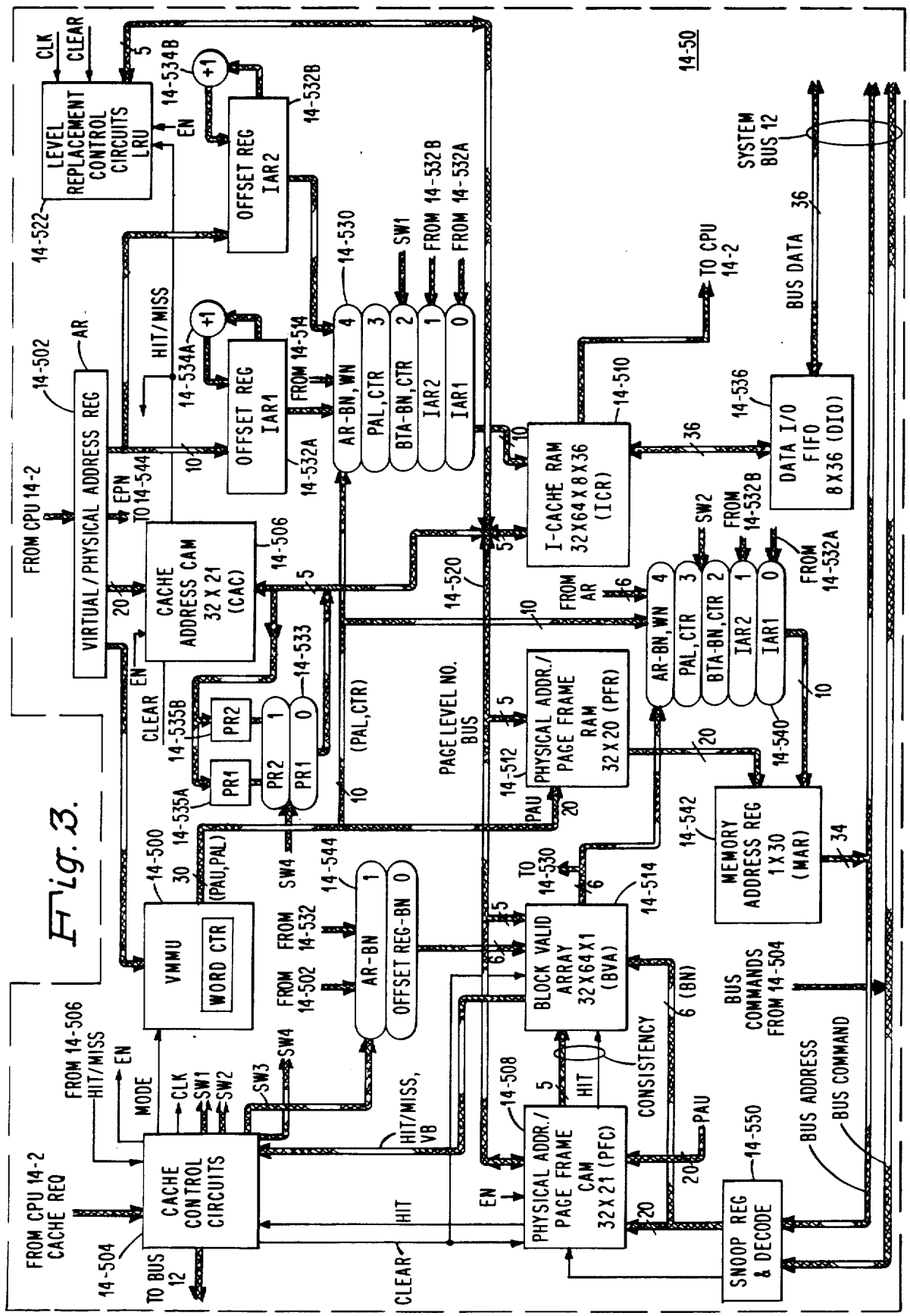

Each cache unit includes a data cache memory and an instruction cache memory which are shown in detail in FIGS. 2 and 3. Both cache memories are organized in the same manner, the major difference being that the cache memory of FIG. 2 processes data and the cache memory of FIG. 3 processes instructions. Therefore, the same description for FIG. 2 will not be repeated for FIG. 3.

DATA CACHE MEMORY 14-40

Referring to FIG. 2, it is seen that data cache memory 14-40 includes a virtual memory management unit (VMMU) 14-400 for translating CPU 32-bit virtual addresses into physical addresses. The CPU addresses are received and initially stored in a 32-bit address register (AR) 14-402.

For the purpose of the present invention, the VMMU 14-400 can be constructed from conventional integrated circuit chips. VMMU 14-400 is capable of operation in a virtual address mode and a physical address mode as a function of a mode signal provided by the cache control circuits of block 14-404. When operated in virtual address mode, VMMU 14-400 converts the virtual address segment and page number bits of FIG. 5a into the physical address page frame number bits of FIG. 5b. When operated in physical address mode, VMMU 14-400 inhibits translation and the CPU address bits are transferred for direct use.

In addition to the translation circuits, VMMU 14-400 includes other circuits. For example, it includes a 4-bit word counter used for designating word addresses during cache write operations.

The cache control circuits of block 14-404 operate to decode the cache requests it receives from CPU 14-2. In response to such requests, it generates the required sequence of control signals in addition to command signals which are applied via the command portion of system bus 12 for directing the transfer of data into and out of data cache memory 14-40 based upon the input signals it receives from CPU 14-2 and other units within cache memory 14-40 as explained herein. For ease of programming, the control circuits take the form of a microprogrammed control unit.

As shown, cache memory 14-40 includes content addressable memories, such as cache address CAM (CAC) memory 14-406 and physical address CAM (PAC) memory 14-408 in addition to directly addressable memories, such as Page RAM (PGR) memory 14-410, Physical Address RAM (PAR) memory 14-412, Block Tag Array (BTA) memory 14-414 and Page Tag Array (PTA) memory 14-416. According to the teachings of the present invention, all of these memories connect in common to an internal common bus 14-420 as shown. The cache control circuits of block 14-404 by applying enable signals to the different memories, establishes which memory is to serve as the source of page level number signals.

As explained herein, this organizational structure permits all of the related information pertaining to a given page to be directly mapped into the same level in each of the memories where the related information is to be stored. Thus, simultaneous direct access to all of this information is readily obtained by applying a single cache address page level number value to bus 14-420. This minimizes complexity, reduces cost, enhances speed of operation, and provides added flexability.

Additional inputs to PGR memory 14-410 include the output of a four position selector switch 14-430, the page level number from but 14-420 and a clear input signal from control circuits 14-404. The switch 14-430 receives address signals from four sources selected under the control of cache control circuits 14-404 in response to coded signals SW1. The address register 14-402 applies block and word number address signals to position 3, VMMU 14-400 applies PAL and CTR address bits to position 2, BTA memory 14-414 applies block number bits to position 1 and a 10-bit offset register 14-432 and incrementor 14-434 apply block and word number bits to position 0. PGR memory 14-410 connects to a data bus of CPU 14-2 and to the data lines of system bus 12 via a data FIFO array 14-436. The FIFO array 14-436 contains eight 36-bit register locations for storing data words transferred between memory PGR 14-410 and system bus 12. The FIFO 14-436 can be considered conventional in design and could take the form of the FIFO circuits disclosed in U.S. Pat. No. 4,195,340.

The same four sources that connect to switch 14-430 also connect to a second switch 14-440 as shown. The output of switch 14-440 from the source selected in response to coded signals SW2 is applied as one of the inputs to a 30-bit output memory address register 14-442. Register 14-442 receives 20 physical address bits from PAR memory 14-412 which it applies to the address bus of system bus 12 along with the 10 address bits from switch 14-440 and parity bits.

A two-position selector switch 14-444 receives block number (BN) address signals from address register 14-402 and offset register 14-432 selected in response to signal SW3. The output switch 14-444 is applied as an input to BTA memory 14-414. The BTA memory 14-414 also is connected to receive block number (BN) address signals from the address bus of system bus 12 which have been previously stored in a snoop register of block 14-450 in response to a bus write command. The BTA memory 14-414 also receives consistency page number level signals and a hit signal from PAC memory 14-408.

As shown, PAC memory 14-408 couples to the command and address buses of system bus 12 through the "Snoop" register and decode circuits of block 14-450. As explained herein, these connections to system bus 12 permits use of the PAC memory 14-408 in maintaining data consistency. Additionally, PAC memory 14-408 receives the upper 20 physical address bits (PAU) from VMMU 14-400.

Another unit which also connects to common bus 14-420 is the level replacement circuits (LRU) 14-442. These circuits is response to a miss signal from CAC 14-406 generate a page level number code on bus 14-420 specifying where the related information pertaining to the new page is to be stored. The LRU 14-422 includes a replace array which stores information for defining the least recently used page level for replacement. LRU 14-422 may be constructed using conventional register chips. A preferred embodiment of LRU 14-422 is disclosed in the copending patent application of Ming T. Miu, et al., entitled, "Least Recently Used Replacement Level Generating Apparatus," Ser. No. 06/810,945, filed on even date and assigned to the same assignee as named herein.

The organizations of the different CAM and RAM memories are shown in FIGS. 4a through 4e. The CAC memroy 14-406 is a 32 locations by 21-bit content addressable memory (CAM) array. That is, its locations are identified or addressed by their contents. As such, CAC memory 14-406 in addition to including 32, 21-bit register locations has 32 comparison circuits whose outputs feed a priority encoder circuit. An identical comparison or match between the valid 20-bit contents of any location and the 20-bit effective page number (EPN) address of FIG. 5c produces a hit signal which is encoded into a 5-bit page level number value by the priority encoder circuit. In order to detect the occurrence of both segment and page hits, segment and page address bits are compared separately. The priority encoder circuit is used to signal an illegal occurrence of more than one hit signal and for selecting the highest priority binary ONE input in that situation. The CAC memory 14-406 as well as the other CAM memories of FIG. 2 can be constructed from standard integrated circuit chips using well known techniques.

As seen from FIG. 4a, each 20-bits of CAC memory 14-406 stores a 20-bit effective page number (EPN) value and a valid bit (VN). The EPN values represent the 32 most recently used pages resident in PGR memory 14-410 at any given instant and their validity status. The EPN values usually represent virtual status which consist of a 10-bit segment nubmer value and a 10-bit page number value derived from a 32-bit CPU virtual address as illustrated by a comparison of FIGS. 5a and 5c.

In the system of the preferred embodiment, main memory is logically divided into a number of equal segments which corresponds to the largest subdivision of memory space. Each segment is given a unique identification by the user for specifying the collection of information associated with the execution of a process. Main memory has $2^{10}$ or 1024 segments as established by the size of the segment number portion of the virtual address of FIG. 5a.

Each segment is subdivided into smaller units called pages. All of the pages of a segment are of the same size. There are $2^{10}$ or 1024 pages as established by the size of the page number portion of the virtual address of FIG. 5a. Each page has a size of $2^6$ or 64 blocks and each block has $2^4$ or 16 words or 8 double words. These values are established by the sizes of the block and word number portions of the virtual address of FIG. 5a. Each word has 16 bits which corresponds to 2, 8-bit data bytes.

Access to segments is controlled by a ring mechanism which is established by a 2-bit ring number portion of each virtual address (see FIG. 5a). Segment and page addressing is accomplished through the use of segment descriptor tables and pages tables. For further information about these mechanisms, reference may be made to the text entitled, "The Multics System: An Examination of Its Structure," by Elliott I. Organick, Copyright 1972.

When the EPN values represent physical addresses, they consist of a 20-bit page frame number derived from a 30-bit CPU physical address as seen from a comparison of FIGS. 5b and 5c. From the point of view of CAC memory 14-406, there is no difference in operation from that of virtual addresses. In either case, CAC memory 14-406 provides a page level number which is combined with the block and word number values derived from the CPU virtual address or offset value of the CPU physical address to form the cache address of FIG. 5d.

FIG. 4b discloses the organizations of PAC memory 14-408 and PAR memory 14-412. Both memories contain 32 register locations for storing the 32 most recently used page frame number values (i.e., the upper 20 bits of the physical address) generated by VMMU 14-400. However, PAC memory 14-408 also contains a valid bit (VB) location in each register location. The contents of PAC memory 14-408 are addressable by any 20-bit page frame number (PFN) portion of a memory physical address of a write command applied to system bus 12 by another one of the other subsystems of FIG. 1.

Comparison circuits within the memory 14-408 operate to generate a hit signal when an identical comparison in page frame numbers is detected. This maintains consistency by permitting the invalidation of those copies of blocks stored in PGR memory 14-410 which have been altered by other subsystems/devices through BTA memory 14-414. That is, PAC memory 14-408 through its comparison priority encoder circuits generates a hit signal and a page level number value which is used to accomplish the required invalidation.

In a similar fashion, PAC memory 14-408 detects synonym problems in response to a new page frame number generated by VMMU 14-400. When virtual address page number values have been mapped into the same physical address frame number, PAC memory 14-408 generates a hit signal which is applied to control circuits 14-404 and a page level number value which is applied to bus 14-420. This in turn results in the invalidation of the appropriate virtual address page in CAC memory 14-406.

The PAR memory 14-412 serves as mapping unit in that it provides the required physical address page frame number values in the case of a cache miss. Because PAR memory 14-412 stores the same page frame number values as stored in PAC memory 14-408, it may be possible to combine the two memories in some manner to share a set of common memory registers. However, for reasons of clarity and simplicity, both memories are shown separately.

FIG. 4c shows the organization of BTA memory 14-414. It has 32 levels, each having 64, 2-bit wide directly addressable register locations. This memory is used track the valid and written status of the blocks within each of the 32 pages stored in PGR memory 14-410. The written bit (WB) locations are used during write back or siphon operations to identify blocks which have been altered by CPU 14-2. For this purpose, BTA memory 14-414 further includes a priority encoder circuit for detecting the presence of written blocks denoted by binary ONES when a number of locations are accessed in parallel. The valid bit (VB) location is used to maintain data consistency as discussed earlier.

FIG. 4d shows the organization of PGR memory 14-410. This memory serves as the data sotre and holds up to 32 pages, each two kilobytes in size. As shown, each page is subdivided into 64 blocks, each block having 8 double words or 16 words or 32 bytes.

FIG. 4e shows the organization of PTA memory 14-416. This memory maintains status for each of the 32 pages stored in PGR memory 14-410 which the data chache 14-40 uses to make control decisions regarding the pages. As showns, memory 14-410 has 32, 2-bit locations. The first bit location stores a private bit which when set indicates that only the current process will use that page. The second bit location stores a modified bit which when set indicates that the shared memory image or a page in main memory has been altered since it was last retrieved from virtual store (e.g. I/O disk storage).

INSTRUCTION CACHE MEMORY 14-50

As seen from FIG. 3, the instruction cache memory 14-50 is organized in the same manner as data cache memory 14-40. Similar reference numberals are used to designate like blocks in FIGS. 2 and 3 (e.g. 14-400, 14-500 and 14-410, 14-510, etc.). The differences are those changes required for efficient and high speed instruction processing. For this reason, a combination of page registers 14-535A, 14-535B and instruction address registers 14-534A, 14-534B are utilized inplace of offset register 14-432 for the storage of page level number and offset values, respectively.

As shown, the outputs of the page registers 14-535A and 14-535B connect to different positions of a two-position selector switch 14-533. The outputs of instruction address registers 14-532A and 14-532B connect to the 0 and 1 positions of selector switch 14-530. The instruction address registers 14-532A and 14-532B also include increment circuits 14-534A and 14-534B.

The pairs of page and instruction address registers 14-535A and 14-535B and 14-532A and 14-532B permit the concurrent processing of instructions from two blocks of instructions. Briefly, when an instruction fetch request is received by cache memory 14-50, the virtual address offset value consisting of the block number and double word number is loaded into the instruction address register not being used (e.g. IAR2). At the same time, the corresponding page register (e.g. PR1) is loaded with the page level number value. Thereafter, under the control of signals from the cache control circuits 14-504, the first positions of selector switch circuits 14-530 and 14-533 are enabled for transferring signals representative of the offset and page level number values. Each time CPU 14-2 accesses an instruction, the contents of the instruction address register (e.g. IAR2) are incremented by one and returned to the register.

It will be noted that since cache memory 14-50 is dedicated to processing CPU requests for instructions rather than data, it can be simplified in certain respects. That is, the modified bit positions of BTA memory 14-414 shown in FIG. 4c and the priority encoder can be eliminated. Also, PTA memory 14-416 can be eliminated.

DESCRIPTION OF OPERATION OF CACHE MEMORY 14-40

With reference to FIGS. 1, 2, 4a through 4e, and 5a through 5d, the operation of cache memory 14-40 will now be described in connection with the flow diagrams of FIGS. 6a and 6b. It is assumed that cache memory 14-40 receives a request for data. The request includes signals specifying the type of request together with a virtual address having the format of FIG. 5a. As seen from FIG. 6a, prior to processing requests, the cache memory 14-40 will have been previously initialized to a known state following the system of FIG. 1 having been powered up (i.e., block 602).

Figure 6B:
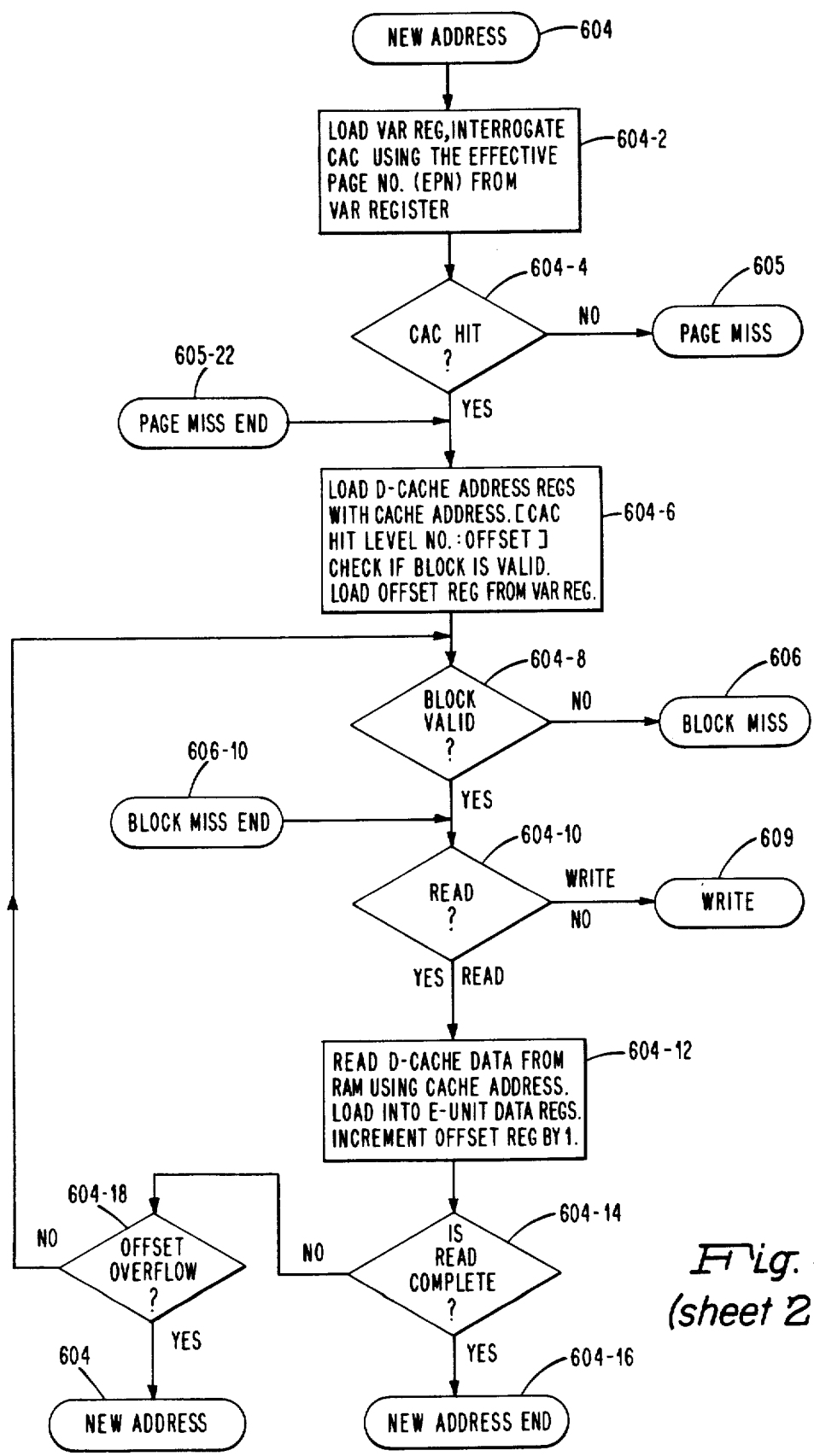
Figure 6B:
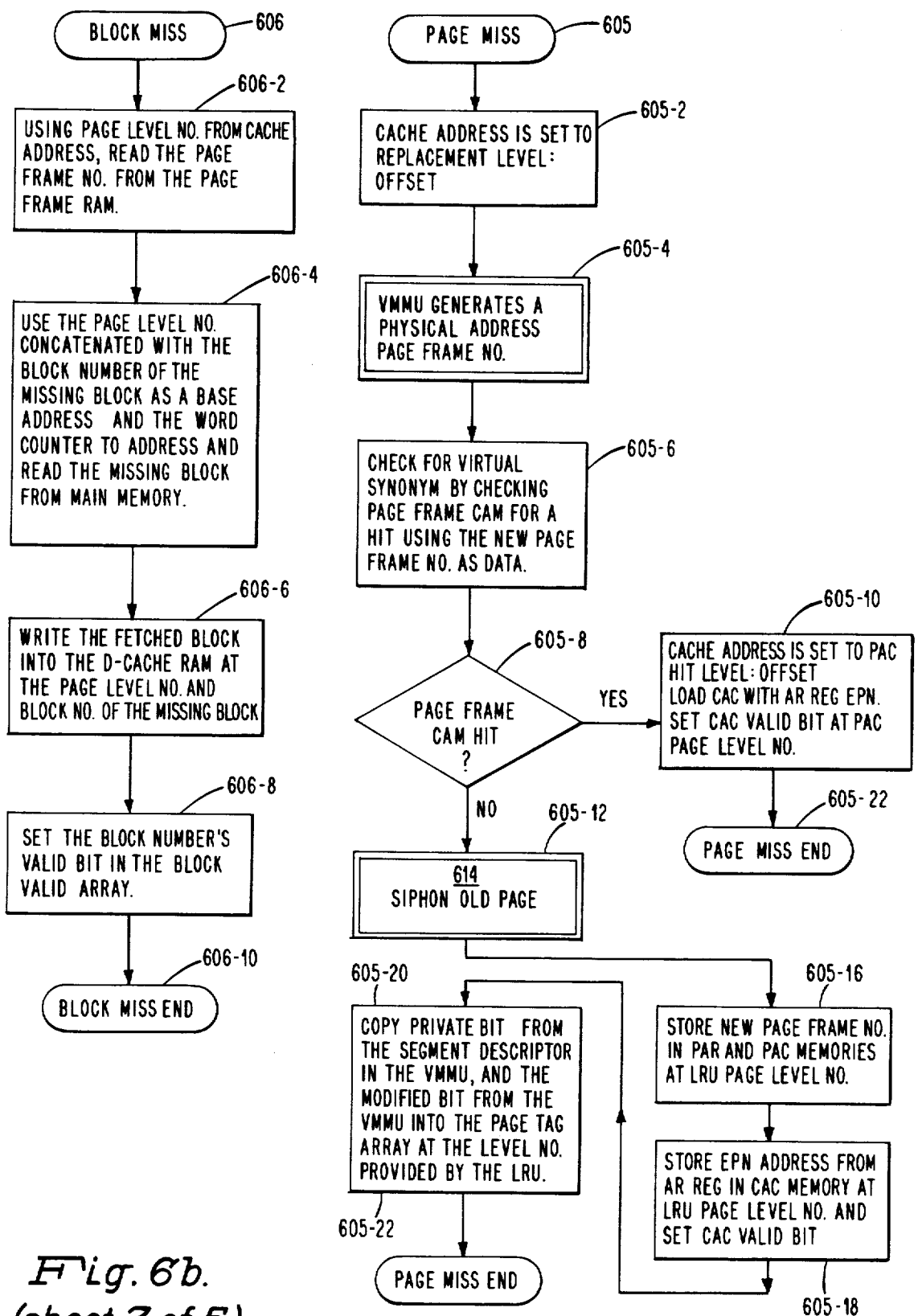

From FIG. 6b, it is seen that during initialization, the cache control circuits 14-404 initialize CAC memory 14-406, PAC memory 14-408, BYA memory 14-414 and PTA memory 14-416 via a clear signal applied to the clear input terminals of each memory (i.e., block 602-2). This results in the valid bit (VB) positions within the CAC and PAC memories 14-406 and 14-408 of FIGS. 4a and 4b, the valid and written bit positions of BTA memory 14-414 of FIG. 4c and private and modified bit positions of the PTA memory 14-416 of FIG. 4e all being cleared to binary ZEROS.

Also, as shown in block 602-4, the replacement control circuits 14-422, in response to the clear signal, set up 32 locations with initial level values in its array. The locations are assigned values 0 through 31 wherein the value 31 is the most recently used and value 0 is the least recently used. The locations are updated in a round robin fashion to provide the replacement of pages on a least recently used basis. Next, the cache address registers 14-432 and 14-442 are cleared to ZEROS (i.e., block 602-6). Now, cache memory 14-40 is ready to process CPU requests (i.e., block 604) and monitor bus write requests received from other subsystems of FIG. 1 (i.e., block 608).

As previously mentioned, PAC memory 14-408 performs a bus watch or monitoring function in the manner illustrated by blocks 608-2 through 608-8. More specifically, the snoop register and decode circuits 14-450 monitor the requests applied to system bus 12 by other subsystems. Upon detecting a write to memory request, the circuits 14-450 generate an output write signal which is applied to PAC memory 14-408. This causes the 20 physical address page frame number bits of that request to be loaded into the snoop register part of block 14-450. The write signal also causes PAC memory 14-408 to interrogate its contents using the page frame number bits. If no match or hit is detected, the above operations are repeated.

When a hit is detected, PAC memory 14-408 applies a hit signal as an input to the cahce control circuits 14-404. It also applies a page level number value as an input to BTA memory 14-414 together with the block number of the write request previously stored by circuits 14-450. Under control of the circuits 14-404, the valid bit of the designated block at the specified level is reset to a binary ZERO. Only the presence of a write request or command generated by another subsystem will be detected by the circuits of block 14-450. As seen from block 608-8, after the invalidation operation, monitoring continues. It will be noted that through these use of the page level number value, cache memory 14-40 maintains data consistency in a fast and efficient manner.

In parallel, with maintaining bus consistency, cache memory 14-40 processes CPU data requests. The occurrence of a data request results in the performance of the sequence operations shown in blocks 604-2 through 604-18 of sheet 2 of FIG. 6b. As shown, in response to a CPU data request, virtual address register 14-402 is loaded with a virtual address formatted as shown in FIG. 5a. Using the 20-bit effective address number (EPN) bits (FIG. 5c), the contents of CAC memory 14-406 are interrogated. If CAC memory 14-406 detects an identical match between the EPN bits and the segment and page number bit contents of one of the CAC memory locations, it operates to generate a hit signal and a page level number value on internal bus 14-420.

The cache address made up of the page level number from CAC memory 14-406 and offset from register 14-432 is loaded into the address registers of BTA memory 14-414 and PGR memory 14-410. Also, the block and word (BN, WN) values are loaded into offset register 14-432. The valid VB bit for the specified block is checked by BTA memory 14-414. If it is valid (a binary ONE) and the CPU cache request is a read request, the cache control circuits 14-404 cause the requested 36-bit data double word to be read out from PGR memory 14-410 onto the input but of CPU 14-2 and loaded into the CPU's execution (E) unit data registers. During the same cache control cycle of operation, the contents of offset register 14-432 are incremented by one.

As shown, if the cache control circuits 14-404 determine that the read operation is complete (i.e., only one double word requested), this completes the operation and the cache memory 14-40 is ready to process another CPU request. If the read operation is not complete (i.e., more than a single double word requested), then cache control circuits 14-404 test for the occurrence of an offset overflow condition. If an overflow is detected, the cache memory 14-40 will initiate another new address sequence. In the absence of an overflow, the read operation is continued upon another double word from PGR memory 14-410.

As seen from block 604-4, if a CAC miss is detected, the sequence of operations of blocks 605-2 through 605-22 (FIG. 6b, Sheet 3) are performed. More specifically, the cahce control circuits 14-404 cause LRU replacement circuits 14-422 to apply a page level number value to bus 14-420. This number concatenated with the offset value is used as the cache address by the siphon old page sequence of block 614.

Next, VMMU 14-400 generates a 20-bit physical address having the format of FIG. 5b. The page frame number bits (PAU) are applied to the PAC memory 14-408 and used to check for the presence of virtual address synonyms. If PAC memory 14-408 detects an identical comparision between the page frame numbers, it generates a hit signal and page level number signals as outputs. The page level number and offset values are concatenated for form the cache address applied to bus 14-420. As seen from block 605-10, the cache control circuits 14-404 load the CAC location designated by the PAC page level number signals with the EPN value from AR register 14-402. At the same time, the valid bit VB in the CAC location is set to a binary ONE. This prevents the mapping of more than one virtual address into the same physical address.

If a page frame hit is not detected by PAC memory 14-408, then a siphon operation is performed as indicated by block 605-12. That is, the sequence of operations of blocks 614-2 through 614-12 is performed. This results in the transfer of written blocks of a page back to main memory so that the blocks of a new page can be written into the same page.

As seen from block 614-2, the page level number value generated by the LRU replacement circuits 14-422 is used to obtain the block number value for any written block in that page. A group of written bit (WB) locations are read out and the BTA priority encoder circuit generates a block number (BN) value for the highest priority location containing a binary ONE. The page level number from the LRU circuits 14-422 concatenated with the BTA block number value selected via position two of switch 14-430 is used as a cache address to read out the block of word from PGR memory 14-410, a double word at a time into FIFO memory 14-436.

Also, the LRU page level number value is used to read out the physical address page frame number from PAR memory 14-412. The PAR memory page frame number concatenated with the BTA memory written block number and VMMU word counter selected via position 1 of switch 14-440 is loaded into memory address register 14-442. This address is incremented by VMMU 14-400 and is used to write the block of eight double words from PGR memory 14-410 into main memory. As seen from block 614-10, when the entire block has been written, the LRU page level number and BTA written block number values applied to bus 14-420 are used to reset the block written bit of the block written into main memory.

As seen from FIG. 6b, the sequence of operations of blocks 614-2 through 614-12 are repeated for each written block detected by the BTA priority encoder circuit. That is, the same group of block written bits are accessed and examined for binary ONES until none are detected. This same operation is performed on a next group of block written bits until all of the 64 block written bits have been examined and reset. At this time, the siphon operation is complete and the sequence is resumed.

As indicated by block 605-16, the LRU page level number value applied to bus 14-420 is used to write the VMMU new page frame number value (PAU) into the appropriate locations of PAR and PAC memories 14-412 and 14-408. Also, the effective page number (EPN) address bits from AR register 14-402 are written into the CAC memory location specificed by the same LRU page level number value with the valid bit position of the location being set to a binary ONE. As block 605-20 indicates, signals representative of the private and modified bits from segment and page descriptors stored by VMMU 14-400 are written into the PTA memory location specified by the LRU page level number value. This completes the page miss sequence.

As seen from block 604-6, the cache address made up of the page level number from the LRU circuits 14-422 and offset from register 14-432 is loaded into the BTA and PGR address registers. Again, the valid VB bit is selected as described above. From block 604-8, it is seen that when the block valid bit of the requested block is not valid, the sequence of operations defined by blocks 606-2 through 606-8 is performed. This results in the requested block being fetched from main memory. As indicated by block 606-2, the page level number value of the cache address applied to but 14-420 by CAC memory 14-406 is used to read the page frame number value from PAR memory 14-412 into memory address register 14-442.

The page level number value concatenated with the block number (BN) value obtained in block previously stored in offset register 14-432 in block 604-6 are used as a base address selected via position 0 of switch 14-440, to transfer the missing block from main memory into cache memory 14-40. The double words transferred from main memory into FIFO memory 14-436 are written into PGR memory 14-410 at the locations defined by the page level number and BTA block number and word counter values applied via position 1 of switch 14-430. At the completion of the eight double word transfer, the valid bit position in the BTA memory 14-414 of the block defined by the CAC/LRU page level number is set to a binary ONE. This completes the block miss sequence.

Assuming the requested block was valid, it is seen from block 604-10 that the cache control circuits 14-404, upon detecting that the request was a write, causes the sequence of operations of blocks 609-2 through 609-10 to be performed. This results in a double word being written into PGR memory 14-410 from the output bus of CPU 14-2. More specifically, the CAC/LRU page level number value and effective block number value from AR register 14-402 applied via position 3 of switch 14-430 are used as a cache address to access the appropriate location in PGR memory 14-410. The double word is written into the location under the control of cache control circuits 14-404.

The same CAC/LRU page level number value is used to address PTA memory 14-416 for testing the state of the page modified bit. If the modified bit is on (i.e., a binary ONE), the page private bit is also accessed from PTA memroy 14-416 using the same CAC/LRU page level number value. If the page private bit is on (a binary ONE), the page level number value concatenated with the effective block number value of AR register 14-402 applied aiv position 1 of switch 14-444 is used to address BTA memory 14-414. Cache control circuits 14-404 cause the written bit of the specified block to be set to a binary ONE. At this time, the write sequence is complete. It is assumed that each write request from the CPU is initiated separately. Therefore, the cache control circuits 14-404 will now wait for new cache operation requests as shown by block 602-8.

As seen from FIG. 6b, the absence of the modified bit and the private bit having been set, cause a set modified and global sequences to be performed. The set modified sequence of operations of blocks 610-2 through 610-8 cause the VMMU 14-400 to perform a validity test on the page descriptor fetched from main memory and update and restore the descriptor to main memory if valid. The global sequence of operations of blocks 612-2 and 612-4 causes nonprivate or shared data written into PGR memory 14-410 by CPU 14-2 to also be written into main memory.

As seen from block 612-2, the CAC page level number is used to obtain the page frame number address from PAR memory 14-412. This value if concatenated with the contents of offset register 14-432 applied via position 0 of switch 14-440 to form the physical address which is loaded into MAR register 14-442. Using the same page level number and offset register value applied via position 0 of switch 14-430 as a cache address, the data contents of location written into by CPU 14-2 are read out to FIFO memory 14-436. From there, the data is written into main memory at the location specified by the physical address stored in MAR register 14-442.

Figure 6C:
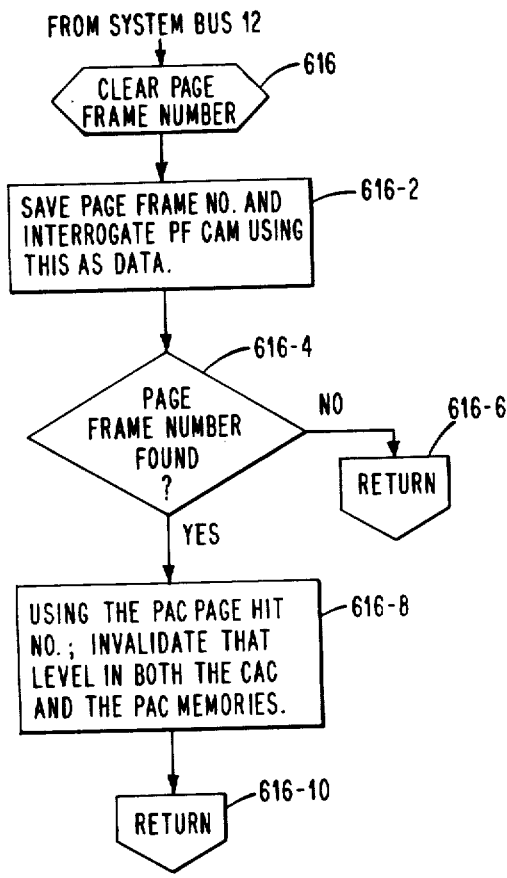
FIG. 6c is a flow diagram used to show how system command functions are performed by the data cache memory of FIG. 2.
Figure 6B:
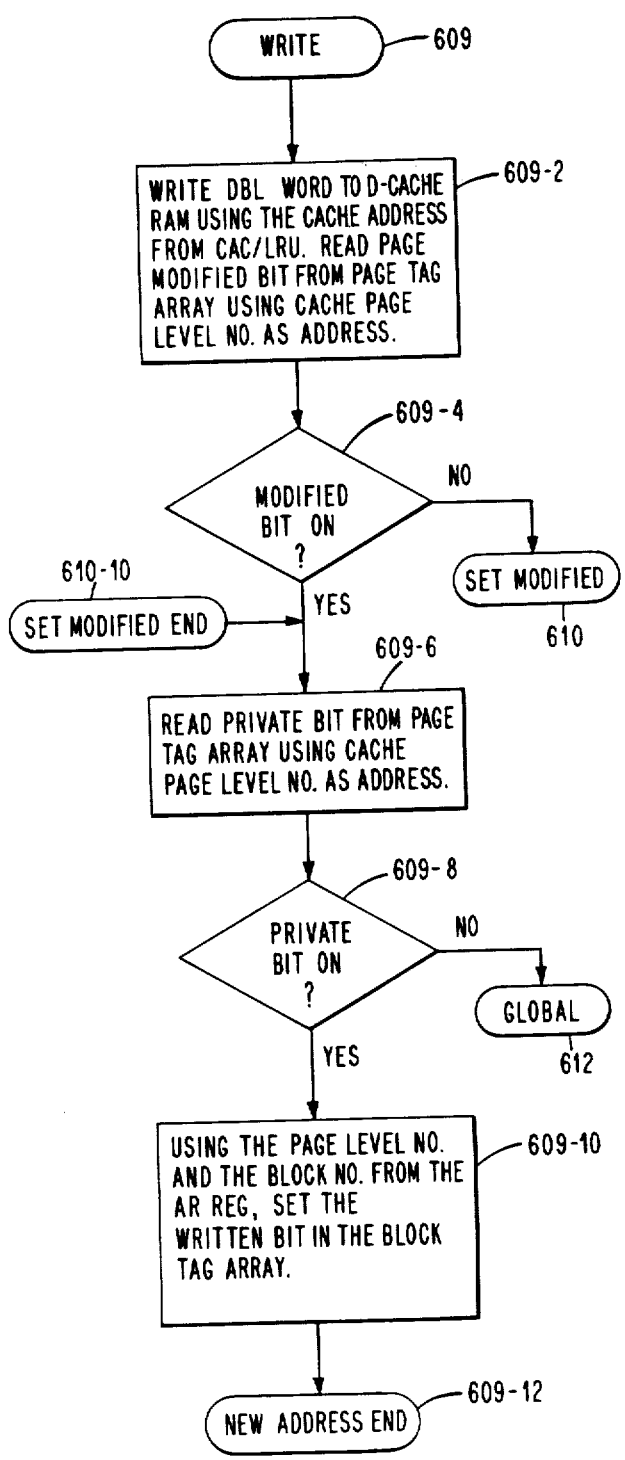
Figure 6B:
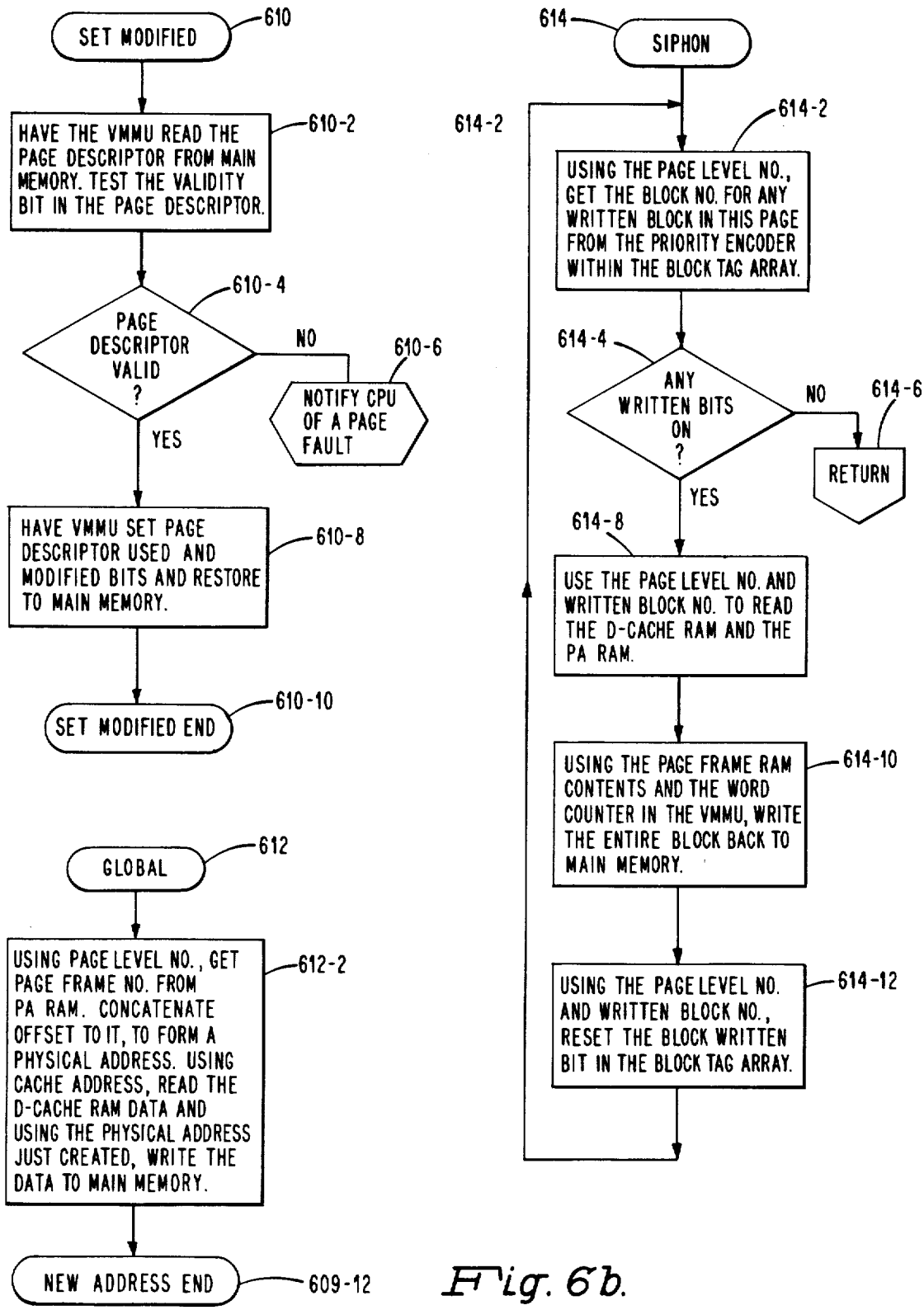
Figure 7B:
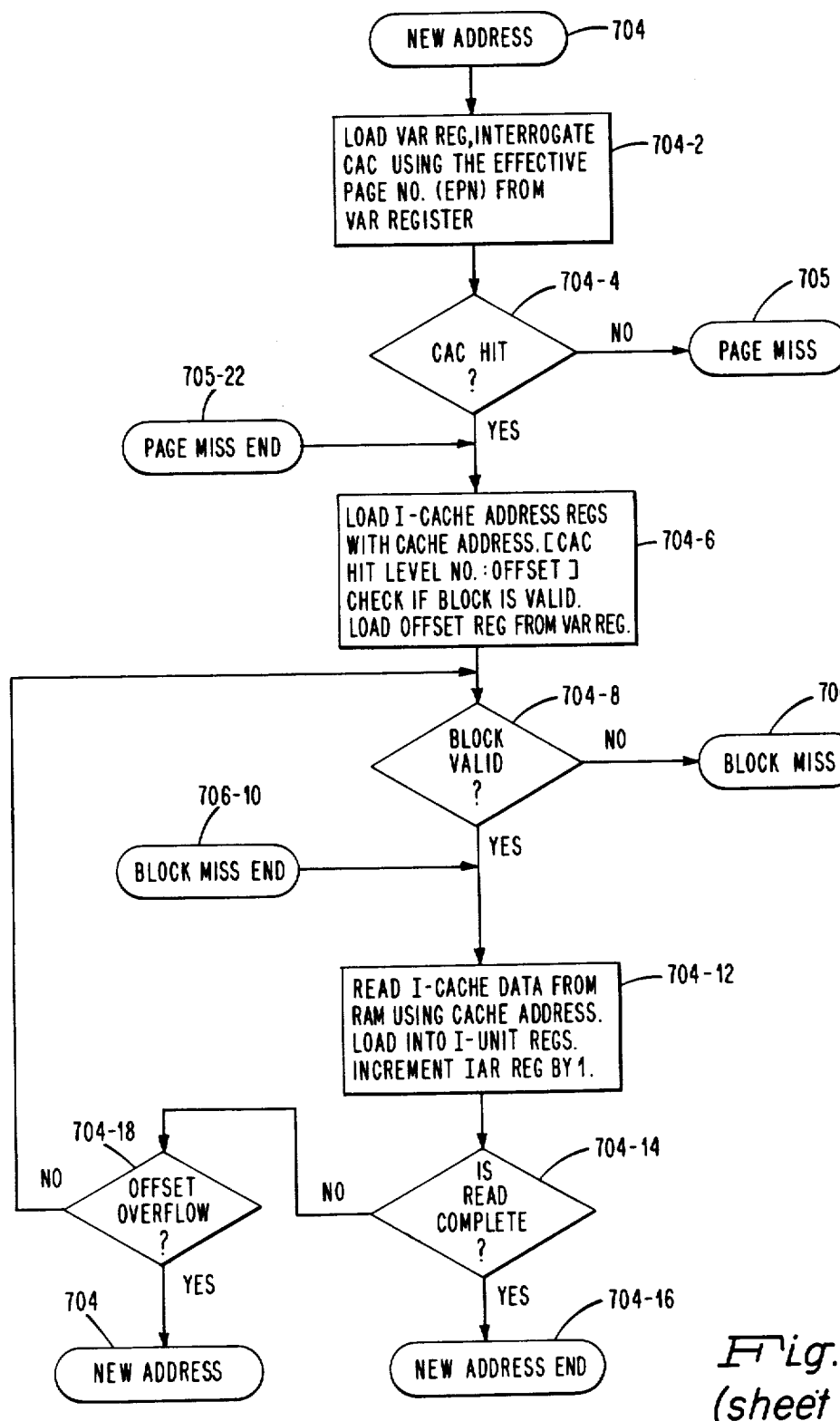
Figure 7C:
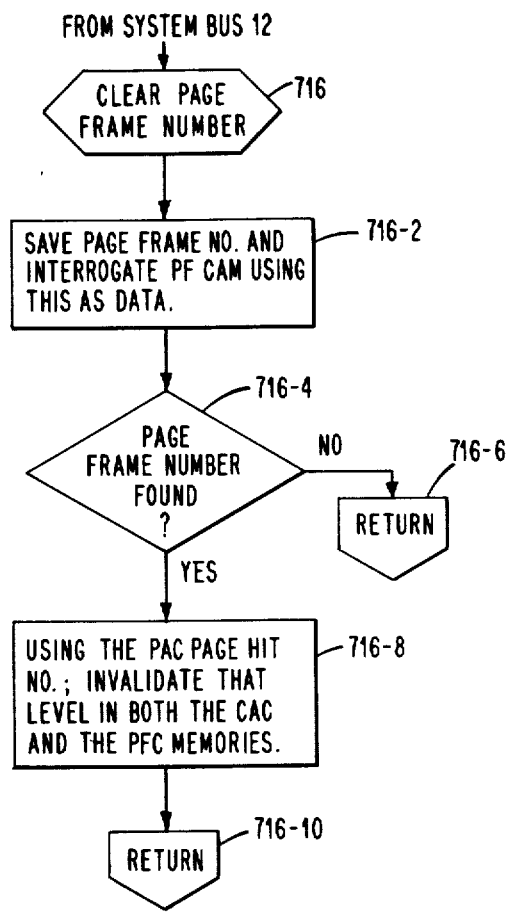
FIG. 7c is a flow diagram used to show how system command functions are performed by the instruction cache memory of FIG. 3.

FIG. 6c provides an example of how the cache organization of the present invention also facilitates the execution of certain operating system functions (system commands) requiring alternations in information pertaining to a given page. For example, after a given period of time of inactivity, it becomes desirable to eliminate data pertaining to an old process. This can be done by a system command initiated by any central subsystem which is broadcasted to all central subsystems of FIG. 1 via the command bus portion of system bus 12. This causes the sequence of operations of blocks 616-2 through 616-8 to be performed. The operation designates the clearing of a page frame number value specified by the system command which has been stored in snoop register 14-450. As shown, this value is applied by the snoop register 14-450 to PAC memory 14-408. If a hit is detected, PAC memory 14-408 generates a hit signal and applies the page level number to bus 14-420. The page level number value is used to invalidate the page information in the specified level in both CAC memory 14-406 and PAC memory 14-408 by causing cache control circuits 14-404 to reset the associated valid bit positions to ZEROS. Thus, through the use of page level number value, the specified operation can be performed expeditiously.

DESCRIPTION OF OPERATION OF CACHE MEMORY 14-50

From a comparison of FIGS. 6a through 6c and FIGS. 7a through 7c, it can be seen that both the data and instruction cache memories of 14-40 and 14-50 of FIGS. 2 and 3, respectively, operate in a similar fashion. This is illustrated through the use of similar reference numbers in FIGS. 6a through 6c and FIGS. 7a through 7c. The differences reside in that since cache memory 14-40 fetches instructions, certain sequences of operations can be eliminated (i.e., siphon and write sequences). Hence, the address sequence of FIG. 6b is simplified.

It will be noted that the presence of CAC memory hit and block valid condition result in the loading of the CPU instruction (I) unit with the requested instruction double word obtained from ICR memory 14-510. At that time, the instruction address register offset block number and double word contents of IAR register in use are incremented by one. This arrangement of instruction address and page level number registers permits rapid transfer of instructions to CPU 14-2 by cache memory 14-50. That is, since it is more likely that CPU 14-2 will continue to request instructions from the same block, repetition of the loop shown provides fast access and transfer of instructions from ICR memory 14-510. The transfer occurs until an overflow is detected at which time another page will be required.

As seen from the above, the same cache organization of the present invention can be used in the construction of both data and instruction cache memories. It provides immediate access to all of the related information pertaining to a page through the use of a common cache address. Whenever, it beomes desirable to perform other operations on a page (e.g. security operations), additional memories can be added to the page level number bus to access the associated information.

Since input CAM memory performs virtual or physical address comparison on only a singel tag value, operational speed for page level number generation is increased. Moreover, in the case of data cache memory 14-40, while only 32 levels are shown, the number of pages can be increased substantially with little affect on operational speed. It will be understood by those skilled in the art that the operations set forth in the flow diagrams of FIGS. 6a through 6c and FIGS. 7a through 7c are for the purpose of illustration. For example, it may be possible to combine certain operations or perform them at different times to reduce steps and conserve cache control cycles.

Also, it will be appreciated by those skilled in the art that many other changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A cache memory for use in a multiprocessing system in which a number of processing units connect in common to share a main memory, said main memory being divided into a number of segments in which each segment includes a plurality of pages, each containing a plurality of blocks, each of which has a plurality of words, said cache memory being coupled to one of said processing units for providing fast access information fetched from said main memory in response to requests for information received from said one processing unit, each request including an input address for identifying the information words to be accessed from said cache memory, said cache memory comprising:

a plurality of content addressable memories, each having an input and an output and containing a plurality of locations for storing address information pertaining to each of a predetermined number of said plurality of pages, a first one of said content addressable memories having said input coupled to receive said input address from said one processing unit;

a plurality of directly addressable random access memories, each having an input and an output and containing a plurality of locations for storing address, control and data information pertaining to each of said plurality of pages;

a common internal bus connecting said output of said first one of said content addressable memories, said input of each of the remaining content addressable and said input of each of said directly addressable memories in common; and, cache control means coupled to receive said requests from said one processing unit, said cache control means being operative in response to each request for information to apply a first portion of said input address corresponding to an effective address only to said first one of said content addressable memories, said first content addressable memory being operative upon detecting a hit condition indicating that the page containing the requested information resides in cache memory to generate a page level value on said bus identifying where information is stored in said content addressable and directly addressable memories pertinent to said page, said cache control means applying said page level number value together with other portions of said input address as a cache address to other ones of said content addressable and directly addressable memories as required for reading out the requested information words to said one processing unit.

2. The cache memory of claim 1 wherein said input address is a virtual address and said first content addressable memory locations contain segment and page virtual addresses identifying which ones of said main memory segment pages have been allocated storage locations in said cache memory and said cache memory further including virtual memory address translation means coupled to receive said input address from said one processing unit enabling the translation to overlap the interrogation of said first content addressable memory for determining the presence of said hit condition and the generation of said page level number value for accessing the requested information words.

3. The cache memory of claim 2 wherein another one of said content addressable memories had locations for storing the physical addresses of said pages allocated storage location in said cache memory and indications of the validity status of said physical addresses, said another one of said content addressable memories being coupled to said virtual memory translation means for receiving each new physical address, said another content addressable memory being operative upon detecting a comparison between said new physical address and any stored valid physical address to generate said page level number value on said bus for storing said new virtual address in one of said locations of said first content addressable memory specified by said page level number value thereby eliminating reloading the same page and preventing the mapping of two virtual addresses into the same physical address.

4. The cache memory of claim 3 wherein said cache memory further includes snoop register and decode means coupled in common with said main memory to receive write requests from other ones of said number of processing units, said write requests including the physical addresses in main memory where information is to be written, said snoop register and decode means being coupled to said another content addressable memory and operative in response to each received write request to condition said another content addressable memory to generate a page level number value upon detecting a comparison between the write request physical address and any stored physical address thereby maintaining consistency between the contents of said main memory and said cache memory.

5. The cache memory of claim 4 wherein the plurality of locations of a first one of said plurality of directly addressable random access memories contain block valid bit indications, said first directly addressable random access memory being coupled to said snoop register means and to said another content addressable memory, said another content addressable memory being operative to generate a hit signal signaling said comparison for conditioning said first directly address random access memory to invalidate the valid bit indication of the block specified by said physical address from said snoop register means located at the level specified by said page level number applied to said bus.

6. The cache memory of claim 1 wherein said cache memory further includes replacement means for generating page level number values, said replacement means being coupled to said first content addressable memory and to said common internal bus, said replacement means being operative in response to a signal from said first content addressable memory indicating the absence of a hit condition to apply a page level number value to said bus for specifying where the information pertaining to the new page is to be written into different ones of said content addressable and directly addressable random access memories.

7. The cache memory of claim 6 wherein a second one of said directly addressable random access memories stores data words of at least one of a plurality of data blocks of each of said plurality of pages allocated storage locations and wherein a third one of said directly addressable random access memories further includes storage locations containing written bit indications for designating any blocks of said each page which have been written into said second one of said directly addressable random access memories and said cache control means being operative in said absence of said hit condition to perform an operation on said page causing each previously written block designated by said written bit indications to be read out from said second directly addressable random access memory for transfer to said main memory enabling a new page to be allocated the same storage locations within said second directly addressable memory.

8. The cache memory of claim 7 wherein a fourth one of said directly addressable random access memories includes a plurality of control bit indications for designating the status of said pages allocated storage locations in said second directly addressable memory, said cache control means being operative in response to each write request to test the state of each of said control bit indications and condition said cache memory to perform the required operations in conjunction with said page based upon the results of said test.

9. The cache memory of claim 6 wherein a second one of said directly addressable random access memories stores instruction words of at least one of a plurality of instruction blocks of each of said plurality of pages allocated storage locations and wherein said cache memory further includes a number of sets of registers, a different register of each set being coupled to said one processing unit and to said input content addressable memory, said cache control means being operative in response to each request to load a selected set of registers with said page level number and portions of said input address corresponding to block and word number values to enable fast transfer of all of the blocks of the same page in response to successive requests.

10. A cache memory for use with a processing unit which connects to a main memory, said main memory being divided into a number of pages, each containing a plurality of blocks, each of which has a plurality of words, said cache memory providing fast access information fetched from said main memory in response to requests for information received from said processing unit, each request including an input address for identifying the information words to be accessed from said cache memory, said cache memory comprising:
    a plurality of content addressable memories, each having an input and an output and containing a plurality of locations for storing a first type of information pertaining to each of a number of said plurality of pages, a first one of said content addressable memories having said input coupled to receive said input address from said processing unit;
    a plurality of directly addressable random access memories, each having an input and an output and containing a plurality of locations for storing other types of information pertaining to each of said plurality of pages;

a common internal bus connecting said output of said first one of said content addressable memories to said input of each of the remaining content addressable and each of said directly addressable memories in common; and, cache control means coupled to receive said requests from said processing unit, said cache control means being operative in response to each request for information to apply a first portion of said input address to said first one of said content addressable memories, said first content addressable memory being operative upon detecting a hit condition indicating that the page containing the requested information resides in cache memory to generate a page level number value on said bus identifying where said other types of information is stored in said content addressable and directly addressable memories associated with said pages, said cache control means applying said page level number value together with other portions of said input address as a cache address to other ones of said content addressable and random addressable memories for accessing the requested information words.

11. The cache memory of claim 10 wherein said input address is a virtual address and said first content addressable memory locations contain page virtual addresses identifying which ones of said main memory pages have been allocated storage locations in said cache memory and cache memory further including virtual memory address translation means coupled to receive said input addresss from said processing unit enabling the translation of said virtual address to a physical address to overlap the interrogation of said first content addressable memory for determining the presence of said hit condition and the generation of said page level number value for accessing the requested information words.

12. The cache memory of claim 10 wherein the locations of a first one of said directly addressable random access memories store valid bit indications for said plurality of blocks for said number of pages, said cache control means in reponse to a signal from said first content addressable memory indicative of said hit condition to enable said first directly addressable random access memory to read out a valid bit indication specified by said page level number value and a block number portion of said outer portions of said input address for determining whether or not a valid block containing the requested information words is stored in said cache memory.

13. The cache memory of claim 12 wherein a second one of said content addressable memories has locations for storing the physical addresses of said pages allocated storage locations in said cache memory and indications of the validity status of said physical addresses, said another one of said content addressable memories being coupled to said virtual memory translation means for receiving each new physical address, said second content addressable memory being operative upon detecting a comparison between said new physical address and any stored valid physical address to generate said page level number value on said bus for storing said new virtual address in one of said locations of said first content addressable memory specified by said page level number value thereby eliminating reloading the same page and preventing the mapping of two virtual addresses into the same physical address.

14. The cache memory of claim 13 wherein said cache memory further includes snoop register and decode means couples in common with said main memory to recieve write requests including the physical addresses in main memory where information is to be written, said snoop register means being coupled to said second content addressable memory and operative in respone to each received write request to condition said second content addressable memory to generate a page level number value upon detecting a comparison between the write request physical address and any stored physical address for maintaining consistency between the contents of said main memory and said cache memory.

15. The cache memory of claim 14 wherein said first directly addressable random access memory couples to said snoop register means to said second content addressable memory, said second content addressable memory being operative to generate a hit signal signaling said comparison for conditioning said first directly address random access memory to invalidate the valid bit indication of the block specified by said physical address from said snoop register means located at the level specified by said page level number applied to said bus.

16. The cache memory of claim 10 wherein said cache memory further includes replacement means for generating page level number values, said replacement means being coupled to said input content addressable memory and to said common internal bus, said replacment means being operative in response to a signal conditioned by said first content addressable memory indicating the absence of a hit condition to apply a page level number value to said bus for specifying where the information pertaining to the new page is to be written into different ones of said content addressable and directly addressable random access memories.

17. The cache memory of claim 16 wherein a second one of said directly addressable random access memories stores data words of at least one of a plurality of data blocks of each of said plurality of pages allocated storage locations and wherein one of a third one of said directly addressable randon access memories further include storage locations containing written bit indications for designating any blocks of said each page which have been written into said second one of said directly addressable random access memories and said cache control means being operative in said absence of said hit condition to perform an operation on said page causing each previously written block designated by said written bit indications to be read out from said second directly addressable random access memory for transfer to said main memory enabling a new page to be allocated the same storage locations within said second directly addressable memory.

18. The cache memory of claim 17 wherein a fourth one of said directly addressable random access memories includes a plurality of control bit indications for designating the status of said pages allocated storage locations in said second directly addressable memory, said cache control means being operative in response to each write request to test the state of each of said control bit indications and condition said cache memory to perform the required operations in conjunction with said page based upon the results of said test.

19. The cache memory of claim 16 wherein a second one of said directly addressable random access memories stores instruction words of at least one of a plurality of instruction blocks of each of said plurality of pages allocated storage locations and wherein said cache memory further includes a number of sets of registers, a different register of each set being coupled to said one processing unit and to said input content addressable memory, said cache control means being operative in response to each request to load a selected set of registers with said page level number and portions of said input address corresponding to block and word number values to enable fast transfer of all of the blocks of the same page in response to successive requests.

20. A method of organizing a cache memory for use with a processing unit which connects in common with other processing units to share a main memory, said main memory being divided into a number of pages, each containing a number of blocks each of which has a plurality of words, said cache memory providing fast access to information fetched from said main memory in response to requests from said processing unit, each request including an input address, said method comprising:
(a) organizing each of a plurality of content addressable and directly addressable memories including a plurality of word locations into a plurality of levels;
(b) storing in the word locations of each level in each memory, a different portion of all of the information pertinent to each page of a maximum number of pages which can be allocated space in said cache memory in response to requests from said processing unit;
(c) connecting all of said memories to a common internal bus for enabling simultaneous access to all of said information of a page stored at the same level;
(d) connecting only one of said content addressable memories between said processing unit and said common internal bus; and,
(e) said one content addressable memory generating a page level number value in reponse to each request received from said processing unit upon detecting a comparison between said input address and the contents of one of said word locations for enabling access to all of said information stored in each of the remaining content addressable and directly addressable memories as required for processing said page.

21. The method of claim 20 wherein said information is obtained by both the associative and direct addressing of said memories.

22. The cache memory of claim 5 wherein another one of said directly addressable memories includes a plurality of locations for storing physical address page frame values for said pages allocated storage locations for said blocks written into said second one of said directly addressable random access memories, said another one of said directly addressable memories in response to said page level number value reading out a corresponding one of said page frame values in the presence of said hit condition from said first one of said content addressable memories and the absence of a valid block bit indication being stored in said first one of said plurality of directly addressable memories for transfer to said main memory to be used for accessing the requested words of a missing block.

* * * * *